United States Patent
Mori et al.

(10) Patent No.: US 12,234,585 B2
(45) Date of Patent: Feb. 25, 2025

(54) HOLDING FRAME, FRAME FORMING PORTION OF A HOLDING FRAME, AND HOLDER FOR A HOLDING FRAME

(71) Applicant: BROTHER KOGYO KABUSHIKI KAISHA, Nagoya (JP)

(72) Inventors: Hiroki Mori, Nagoya (JP); Uchu Yamamoto, Nagoya (JP); Takahira Osamura, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 119 days.

(21) Appl. No.: 17/677,782

(22) Filed: Feb. 22, 2022

(65) Prior Publication Data
US 2022/0275551 A1 Sep. 1, 2022

(30) Foreign Application Priority Data
Feb. 26, 2021 (JP) .................... 2021-029912

(51) Int. Cl.
*D05B 39/00* (2006.01)
*D05C 9/04* (2006.01)
(Continued)

(52) U.S. Cl.
CPC .............. *D05B 39/00* (2013.01); *D05C 9/04* (2013.01); *F16M 13/02* (2013.01);
(Continued)

(58) Field of Classification Search
CPC .......... D05B 39/00; D05B 91/06; D05C 9/04; D05C 9/10; D05C 9/12
See application file for complete search history.

(56) References Cited

U.S. PATENT DOCUMENTS

| 4,404,920 A | * | 9/1983 | Pfuhl | .................... D05B 39/00 112/148 |
| 7,966,957 B2 | * | 6/2011 | Mack | ..................... D05C 9/04 112/103 |

(Continued)

FOREIGN PATENT DOCUMENTS

| JP | 2009-159677 A | 7/2009 |
| JP | 2010-082017 A | 4/2010 |

(Continued)

OTHER PUBLICATIONS

Jun. 21, 2024 Office Action issued in Japanese Patent Application No. 2021-029912.

*Primary Examiner* — Patrick J. Lynch
(74) *Attorney, Agent, or Firm* — Oliff PLC

(57) ABSTRACT

A holding frame includes a frame forming portion and at least one holder. The frame forming portion has a placement surface, a first magnet, and a plurality of first magnetic field generation portions generating magnetic fields with the first magnet. The first magnet is arranged on the frame forming portion so that the orientations of the magnetic fields of the plurality of first magnetic field generation portions that are adjacent are reversed from each other on the placement surface. The at least one holder has a holding surface, a second magnet, and a plurality of second magnetic field generation portions generating magnetic fields with the second magnet. The second magnet is arranged in each holder so that the orientations of the magnetic fields of the plurality of second magnetic field generation portions that are adjacent are reversed from each other on the holding surface.

13 Claims, 10 Drawing Sheets

(51) Int. Cl.
*F16M 13/02* (2006.01)
*H01F 7/02* (2006.01)

(52) U.S. Cl.
CPC ........ *H01F 7/0252* (2013.01); *F16B 2200/83* (2023.08); *H01F 7/02* (2013.01)

(56) References Cited

U.S. PATENT DOCUMENTS

| | | | | |
|---|---|---|---|---|
| 2008/0202399 | A1* | 8/2008 | Mack | D05B 39/00 112/475.18 |
| 2019/0338450 | A1* | 11/2019 | Kawaguchi | D05C 9/04 |
| 2020/0291560 | A1 | 9/2020 | Ueda | |
| 2020/0299885 | A1* | 9/2020 | Taguchi | D05C 9/04 |
| 2021/0087730 | A1* | 3/2021 | Osamura | D05B 39/00 |

FOREIGN PATENT DOCUMENTS

| | | |
|---|---|---|
| JP | 2018-042994 A | 3/2018 |
| JP | 2019-115466 A | 7/2019 |

\* cited by examiner

HOLDING FRAME, FRAME FORMING PORTION OF A HOLDING FRAME, AND HOLDER FOR A HOLDING FRAME

CROSS-REFERENCE TO RELATED APPLICATION

This application claims priority to Japanese Patent Application No. 2021-029912, filed on Feb. 26, 2021, the content of which is hereby incorporated by reference.

BACKGROUND

The present disclosure relates to a holding frame, a frame forming portion of a holding frame, and a holder for a holding frame.

Conventionally, a holding frame that spreads out cloth is known. A conventional holding frame comprises a frame body formed from four frame side portions, and a plurality of holders. Each holder is formed by a top portion, and guide pieces extending in a forked shape from both ends of the top portion. A magnet member is attached to one of the top portion or the frame side portion of the holder, and an attractable member is attached to the other. The holding frame spreads out a cloth by attracting the attractable member with the magnet member in a position facing the attractable member, in a state in which the plurality of holders are made to cover the side frame portions so as to straddle the frame side portions via the cloth.

SUMMARY

The conventional holder is provided with a holding frame in which the length of the attractable member of the frame side portion is longer than the length of the magnetic member of the holder, in the longitudinal direction of the frame side portion in a state in which the holder is attached to the frame side portion via the cloth. This holding frame enables a user to arrange the holders in any position in the longitudinal direction on the long attractable members of the frame side portions. However, because the holders can be arranged in any position, the tension of the cloth held by the holding frame changes in accordance with the position in which the holders are arranged, so the cloth may not be able to be spread out with suitable tension.

The present disclosure was designed to solve the aforementioned problem and aims to provide a holding frame by which a user can easily arrange a holder at a position on a frame forming portion which enables a medium to be held with suitable tension.

A holding frame for holding a medium according to the present disclosure includes a frame forming portion and at least one holder. The frame forming portion has a first magnet and a placement surface on which the medium configured to be placed. The first magnet is arranged along the placement surface. The frame forming portion has an annular shape and has a plurality of first magnetic field generation portions that generates magnetic fields with the first magnet. The first magnet is arranged on the frame forming portion so that the orientations of the magnetic fields of the plurality of first magnetic field generation portions that are adjacent are reversed from each other on the placement surface. The at least one holder has a holding surface and a second magnet. The holding surface sandwiches, with the placement surface, the medium. The second magnet is arranged along the holding surface. Each holder of the at least one holder has a plurality of second magnetic field generation portions that generates magnetic fields with the second magnet. The second magnet is arranged in each holder so that the orientations of the magnetic fields of the plurality of second magnetic field generation portions that are adjacent are reversed from each other on the holding surface. The plurality of first magnetic field generation portions and the plurality of second magnetic field generation portions face each other, and the orientations of the plurality of first magnetic field generation portions is the same as the orientations of the magnetic fields of the plurality of second magnetic field generation portions, in a state in which each holder is attached to the frame forming portion.

With the holding frame described above, attracting magnetic forces are generated between the first magnetic field generation portion and the second magnetic field generation portion when the first magnetic field generation portion and the second magnetic field generation portion are facing each other and are in positions in which the orientations of the magnetic fields thereof are the same. Meanwhile, repelling magnetic forces are generated between the first magnetic field generation portion and the second magnetic field generation portion when the first magnetic field generation portion and the second magnetic field generation portion are facing each other and are in positions in which the orientations of the magnetic fields thereof become reversed. That is, the holder is attached to the frame forming portion only at a fixed position where attracting magnetic forces are generated between the holder and the frame forming portion.

A frame forming portion of a holding frame of the present disclosure holds and sandwiches, in cooperation with at least one holder, a medium and includes an annular placement surface on which the medium is to be placed, and a first magnet having a plurality of first magnetic field generation portions generating magnetic fields. The first magnet is arranged on the placement surface so that the orientations of the magnetic fields of the plurality of first magnetic field generation portions that are adjacent are reversed from each other.

With the frame forming portion of the holding frame described above, the orientations of the magnetic fields of adjacent first magnetic field generation portions are reversed from one another, so attracting magnetic forces are generated between the holder and the frame forming portion.

A holder for a holding frame holding, in cooperation with an annular frame forming portion, a medium according to the present disclosure includes a holding surface sandwiching, with the frame forming portion, the medium, and a second magnet arranged along the holding surface. The second magnet has a plurality of second magnetic field generation portions generating magnetic fields, and the second magnet is arranged on the holding surface so that the orientation of the magnetic fields of the plurality of second magnetic field generation portions that are adjacent are reversed from each other.

With the holder described above, the orientations of the magnetic fields of adjacent second magnetic field generation portions are reversed from one another, so attracting magnetic forces are generated between the holder and the frame forming portion.

BRIEF DESCRIPTION OF THE DRAWINGS

Embodiments of the disclosure will be described below in detail with reference to the accompanying drawings in which.

DETAILED DESCRIPTION

Embodiments

Figure 1:
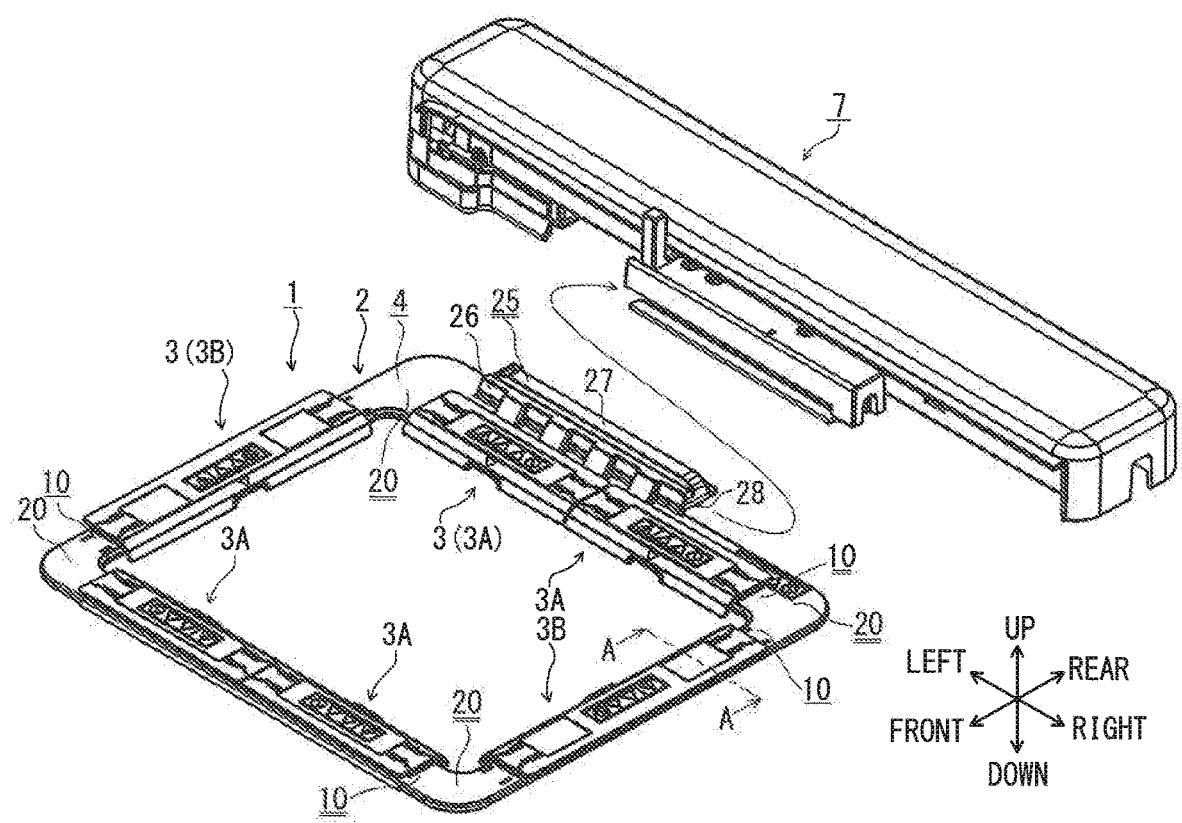
FIG. 1 is a perspective view of a holding frame and an attachment portion of a sewing machine according to one embodiment.

Hereinafter, a holding frame 1 that serves as one embodiment of the present disclosure will be described with reference to the accompanying drawings.

The configuration of the holding frame 1 will now be described with reference to FIG. 1 to FIG. 7. The overall appearance of the structure of the holding frame 1 according to the embodiment will be described with reference to FIG. 1. The holding frame 1 is detachably attached to a sewing machine via an attachment portion 7 of the sewing machine. The detailed configuration relating to the sewing machine is existing technology and thus will be omitted. The holding frame 1 is formed by a frame body 2 and a holder 3. The holder 3 is configured to be able to be attached to or detached from the frame body 2. In the present specification, the up-down direction, the front-rear direction, and the left-right direction point in the directions indicated by the arrows in FIG. 1, based on the line of sight of a user viewing the sewing machine from the front.

Structure of the Frame Body 2

The detailed structure of the frame body 2 will now be described with reference to FIG. 1 to FIG. 4. The frame body 2 has a square structure. The frame body 2 includes a frame forming portion 4, magnet units 5N and 5S, and a fastener 60.

Structure of the Frame Forming Portion 4

The frame forming portion 4 is made of non-magnetic material such as plastic and is molded into a square shape. The frame forming portion 4 includes four frame side portions 10, four connection portions 20, and an attachment portion 25, as illustrated in FIG. 1. The square frame forming portion 4 defines a square inner area A1, as illustrated in FIG. 2.

Figure 2:
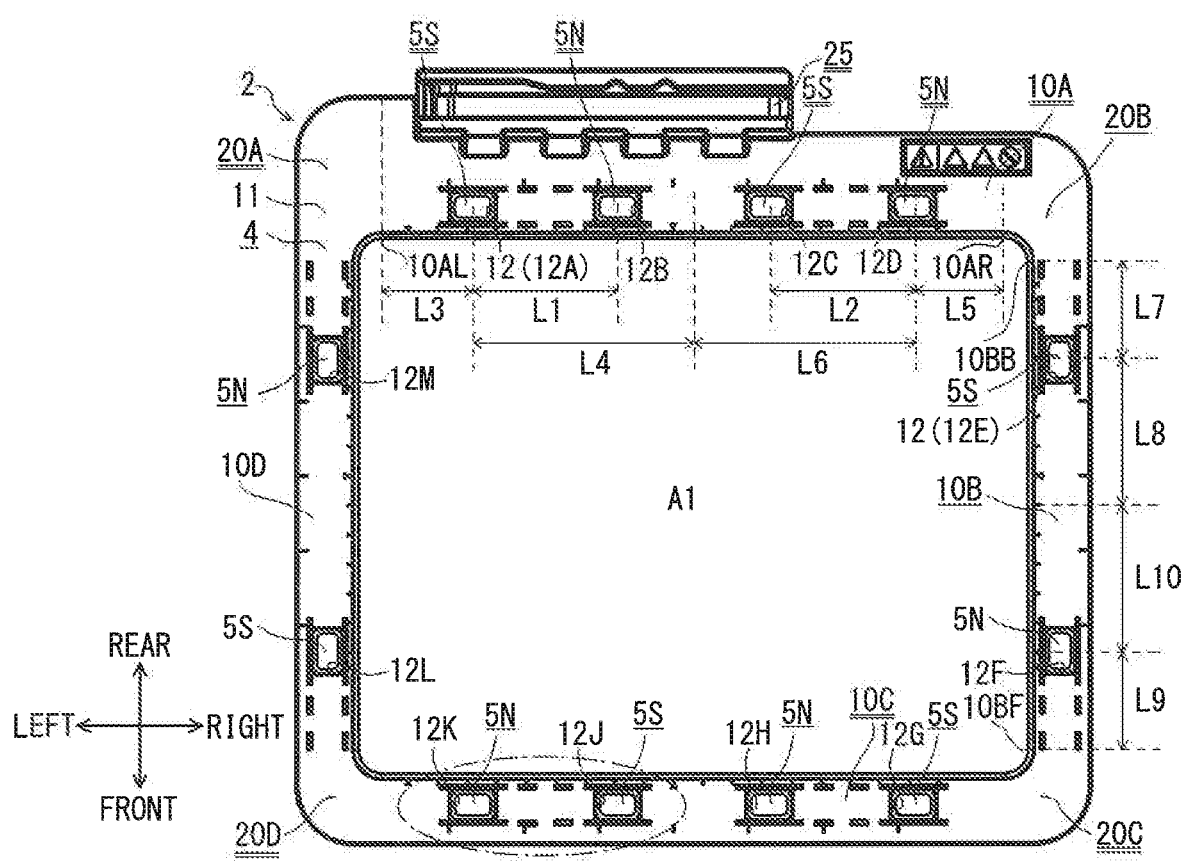
FIG. 2 is a plan view of a frame body.
Figure 7:
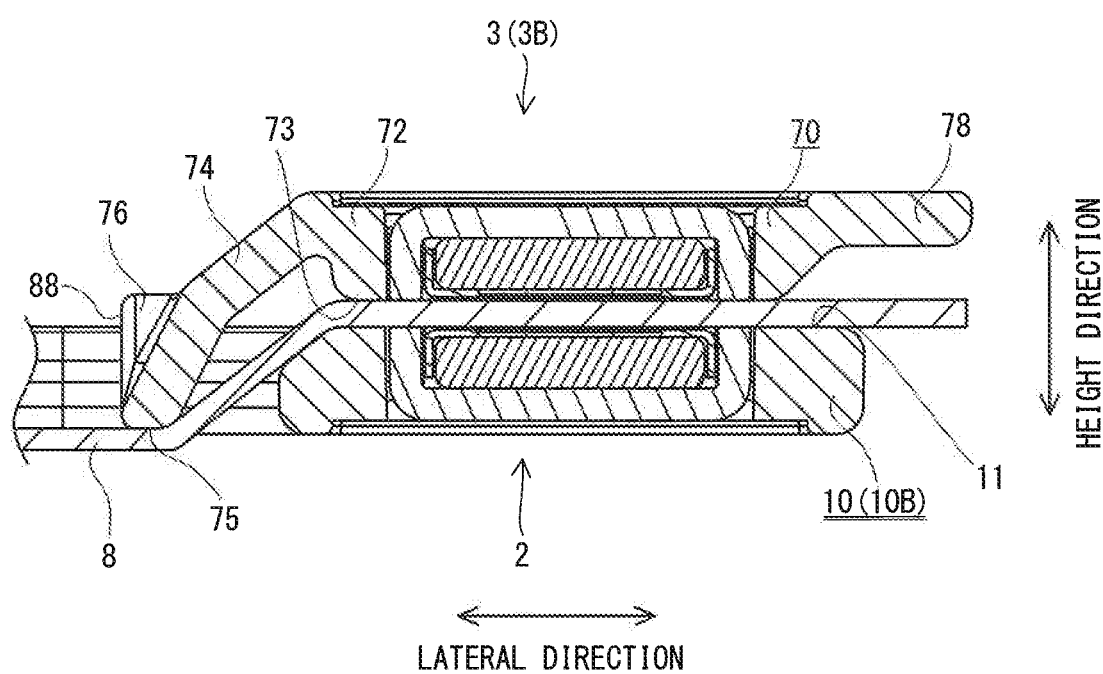
FIG. 7 is a sectional view of a frame side portion and the holder cut along section line A-A shown in FIG. 1, in a state in which a cloth is attached to the holding frame 1.

Structures of the frame side portions 10 and connection portions 20 The four frame side portions 10 are four frame side portions 10A to 10D, as illustrated in FIG. 2. When a frame side portion, of the four frame side portions 10A to 10D, is not specified, or when the four frame side portions are referred to collectively, the term "frame side portion 10" will be used. The frame side portions 10A and 10C extend linearly in the left-right direction. The frame side portion 10 has a square cross section, as illustrated in FIG. 7. An upper end portion near the inner area A1 of an upper surface 11 of the frame side portion 10 is formed inclined downward toward the inner area A1. As illustrated in FIG. 2, the frame side portions 10B and 10D extend linearly in the front-rear direction. In the embodiment, the length in the left-right direction of the frame side portions 10A and 10C is set longer than the length in the front-rear direction of the frame side portions 10B and 10D. When the frame body 2 is attached to the sewing machine, the frame side portions 10B and 10D are arranged parallel to the direction in which an arm portion of the sewing machine extends, so the length of the frame side portions 10B and 10D depends on the length of the arm portion of the sewing machine. Four through-holes 12 that pass through in the up-down direction are formed in each of the frame side portions 10A and 10C. Two through-holes 12 that passes through in the up-down direction are formed in the frame side portions 10B and 10D. A through-hole 12A in the frame side portion 10A is arranged in a position corresponding, in the front-rear direction, to a through-hole 12K in the frame side portion 10C. Similar to the through-hole 12A, through-holes 12B to 12D are arranged in positions corresponding, in the front-rear direction, to through-holes 12J to 12G, respectively, so the frame side portion 10A will be representatively described. A through-hole 12E in the frame side portion 10B is arranged in a position corresponding, in the left-right direction, to a through-hole 12M in the frame side portion 10D. Similar to the through-hole 12E, a through-hole 12F is arranged in a position corresponding, in the left-right direction, to a through-hole 12L, so the frame side portion 10B will be representatively described. All of the through-holes 12 formed in the frame side portions 10A to 10D have the same structure, so when a specific through-hole is not specified or the through-holes are referred to collectively, the term "through-hole 12" will be used.

The four connection portions 20 are four connection portions 20A to 20D. When a connection portion, of the four connection portions 20A to 20D, is not specified, or when the four connection portions are referred to collectively, the term "connection portion 20" will be used. The connection portion 20 is substantially L-shaped. The connection portion 20A connects the frame side portion 10A to the frame side portion 10D. The connection portion 20B connects the frame side portion 10A to the frame side portion 10B. The connection portion 20C connects the frame side portion 10B to the frame side portion 10C. The connection portion 20D connects the frame side portion 10C to the frame side portion 10D.

The four through-holes 12A to 12D in the frame side portion 10A are arranged in a line in the left-right direction. A left end 10AL of the frame side portion 10A is positioned on the leftmost side of a portion of the front end of the frame side portion 10A, which extends linearly in the left-right direction. The left end 10AL connects to the connection portion 20A that bends toward the front. A right end 10AR of the frame side portion 10A is positioned on the rightmost side of a portion of the front end of the frame side portion 10A, which extends linearly in the left-right direction. The right end 10AR connects to the connection portion 20B that bends toward the front. The center of the frame side portion 10A refers to the center between the left end 10AL and the right end 10AR in the left-right direction. The distance L1 between the center of the through-hole 12A and the center of the through-hole 12B in the left-right direction is equal to the distance L2 between the center of the through-hole 12C and the center of the through-hole 12D. The distance L3 between the center of the through-hole 12A and the left end 10AL is shorter than the distance L4 between the center of the through-hole 12A and the center of the frame side portion 10A. The distance L5 between the center of the through-hole 12D and the right end 10AR is shorter than the distance L6 between the center of the through-hole 12D and the center of the frame side portion 10A. The distance L3 is equal to the distance L5, and the distance L4 is equal to the distance L6. That is, the through-holes 12A and 12B and the through-holes 12C and 12D are formed axisymmetrical in the left-right direction with respect to a center line in the front-rear direction that passes through the center of the frame side portion 10A.

The two through-holes 12E and 12F in the frame side portion 10B are arranged in a line in the front-rear direction. A front end 10BF of the frame side portion 10B is positioned on the frontmost side of a portion of the left end of the frame side portion 10B, which extends linearly in the front-rear direction. The front end 10BF connects to the connection portion 20C that bends toward the left. A rear end 10BB of the frame side portion 10B is positioned on the rearmost side of a portion of the left end of the frame side portion 10B, which extends linearly in the front-rear direction. The rear end 10BB connects to the connection portion 20B that bends toward the left. The center of the frame side portion 10B refers to the center between the front end 10BF and the rear end 10BB in the front-rear direction. The distance L7 between the center of the through-hole 12E and the rear end 10BB is shorter than the distance L8 between the center of the through-hole 12E and the center of the frame side portion 10B. The distance L9 between the center of the through-hole 12F and the front end 10BF is shorter than the distance L10 between the center of the through-hole 12F and the center of the frame side portion 10B. The distance L7 is equal to the distance L9, and the distance L8 is equal to the distance L10. That is, the through-hole 12E and the through-hole 12F are formed axisymmetrical in the front-rear direction with respect to a center line in the left-right direction that passes through the center of the frame side portion 10B. The sum of the distance L8 and the distance L10 is longer than the distance L1.

Figure 3:
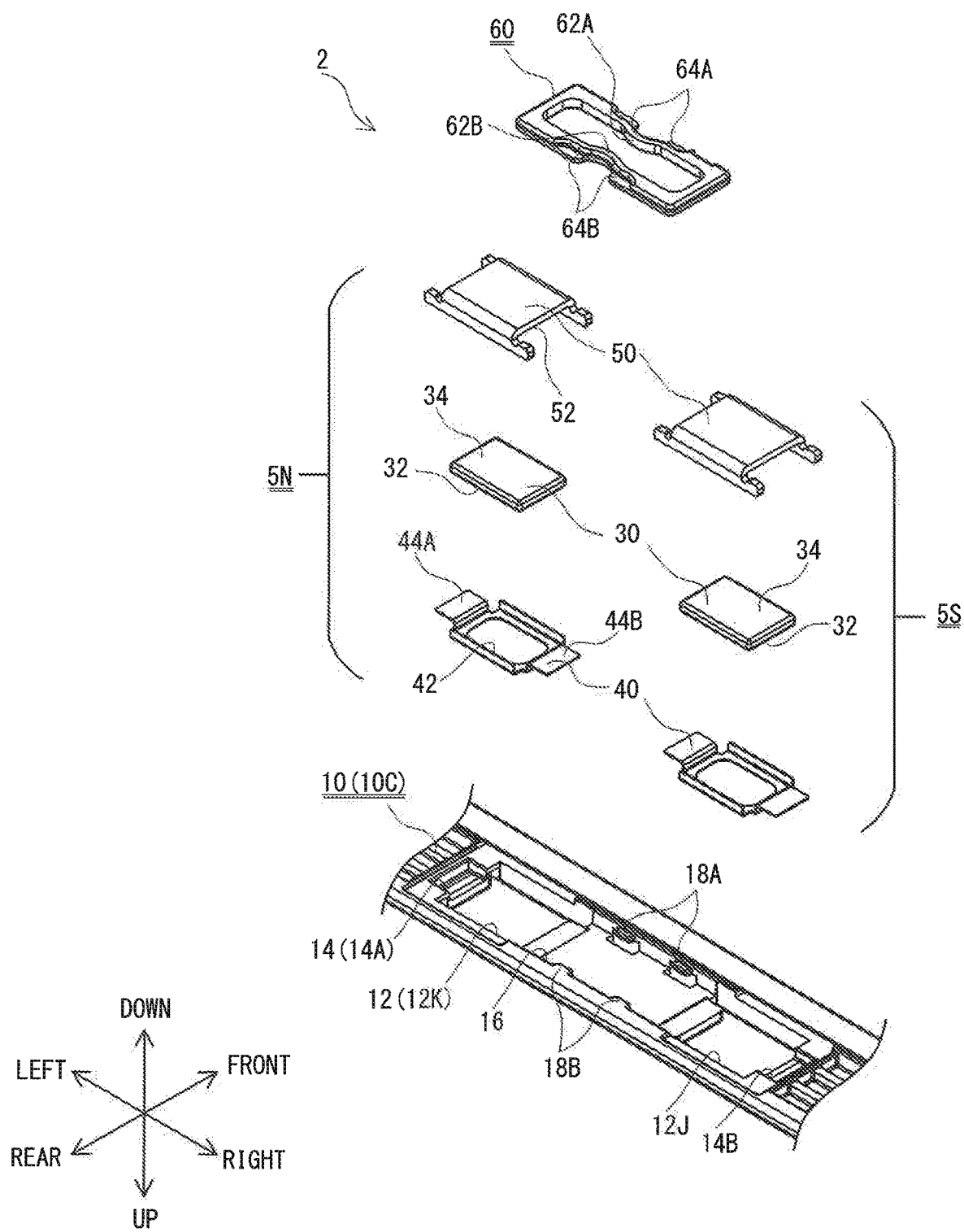
FIG. 3 is an exploded perspective view of the portion encircled by the dashed line shown in FIG. 2 viewed from below.

As illustrated in FIG. 3, openings 14 and 16 that open downward are formed in a lower surface of the frame side portion 10 and are communicated with the through-hole 12. All of the through-holes 12 have the same configuration, so through-holes 12J and 12K will be representatively described. The opening 14A is communicated with the left side of the through-hole 12K, and the opening 14B is communicated with the right side of the through-hole 12J. The opening 16 is formed extending between the through-hole 12K and the through-hole 12J. Two retaining tabs 18A that protrude inside the opening 16 are formed on a side wall on the front side of the frame side portion 10 that defines the opening 16. Two retaining tabs 18B that protrude inside the opening 16 are formed on a side wall on the rear side of the frame side portion 10 that defines the opening 16.

Structure of the Attachment Portion 25

The attachment portion 25 includes a base portion 26 and protrusion portions 27 and 28, as illustrated in FIG. 1. The base portion 26 is a portion that extends in the left-right direction. The protrusion portion 27 protrudes upward from the base portion 26 and extends in the left-right direction. The protrusion portion 28 protrudes downward from the base portion 26 and extends in the left-right direction. The base portion 26 connects to the frame side portion 10A.

Structure of the Magnet Units 5N and 5S

The magnet units 5N and 5S each include a magnet member 30, a fixing frame 40, and a yoke 50, as illustrated in FIG. 3. The magnet units 5N and 5S have the same structure except for that the orientation of the magnetic field generated by the magnetic member 30 is different, so the magnet unit 5N will be representatively described.

Structure of the Magnet Member 30

The magnetic member 30 is a permanent magnet such as a neodymium magnet. The magnet member 30 is substantially cuboid shaped, as illustrated in FIG. 3. The magnet member 30 generates a magnetic field in the up-down direction. With the magnet unit 5N, the N-pole is arranged on an upper surface 32 of the magnet member 30 and the S-pole is arranged on a lower surface 34 of the magnet member 30. With the magnet unit 5S, the S-pole is arranged on the upper surface 32 of the magnet member 30 and the N-pole is arranged on the lower surface 34 of the magnet member 30.

Structure of the Fixing Frame 40

The fixing frame 40 is made of non-magnetic material such as stainless steel. The fixing frame 40 is substantially square in a plan view, as illustrated in FIG. 3. The fixing frame 40 is formed by bending a non-magnetic flat plate. An accommodating slot 42 that accommodates the magnet member 30 is formed in the center portion, in the left-right direction, of the fixing frame 40. A fixing portion 44A extends toward the left from a side wall that forms the accommodating slot 42. A fixing portion 44B extends toward the right from a side wall that forms the accommodating slot 42.

Structure of the Yoke 50

The yoke 50 is made of magnetic material such as iron plating. The yoke 50 is substantially U-shaped in a side view from the left-right direction, as illustrated in FIG. 3. The yoke 50 is formed by bending the magnetic material of a magnetic flat plate such that an opening 52 that opens upward is formed.

Structure of the Fastener 60

The fastener 60 is molded in a square shape from non-magnetic material such as plastic. As illustrated in FIG. 3, deformed portions 62A and 62B are formed on a front end and a rear end, respectively, of the fastener 60, at the center portion in the left-right direction of the fastener 60. The deformed portions 62A and 62B are formed such that the thickness in the front-rear direction becomes smaller than it is at the front end or the rear end of the faster 60 which are portions where the deformed portions 62A and 62B are not formed. Therefore, a user is able to easily deform the deformed portions 62A and 62B by pressing the deformed portion 62A rearward and pressing the deformed portion 62B forward with a finger or a special tool. Two retaining tabs 64A are formed on an upper end of the deformed portion 62A and protrude forward. Two retaining tabs 64B are formed on an upper end of the deformed portion 62B and protrude rearward.

Assembly of the Frame Body 2

Figure 4:
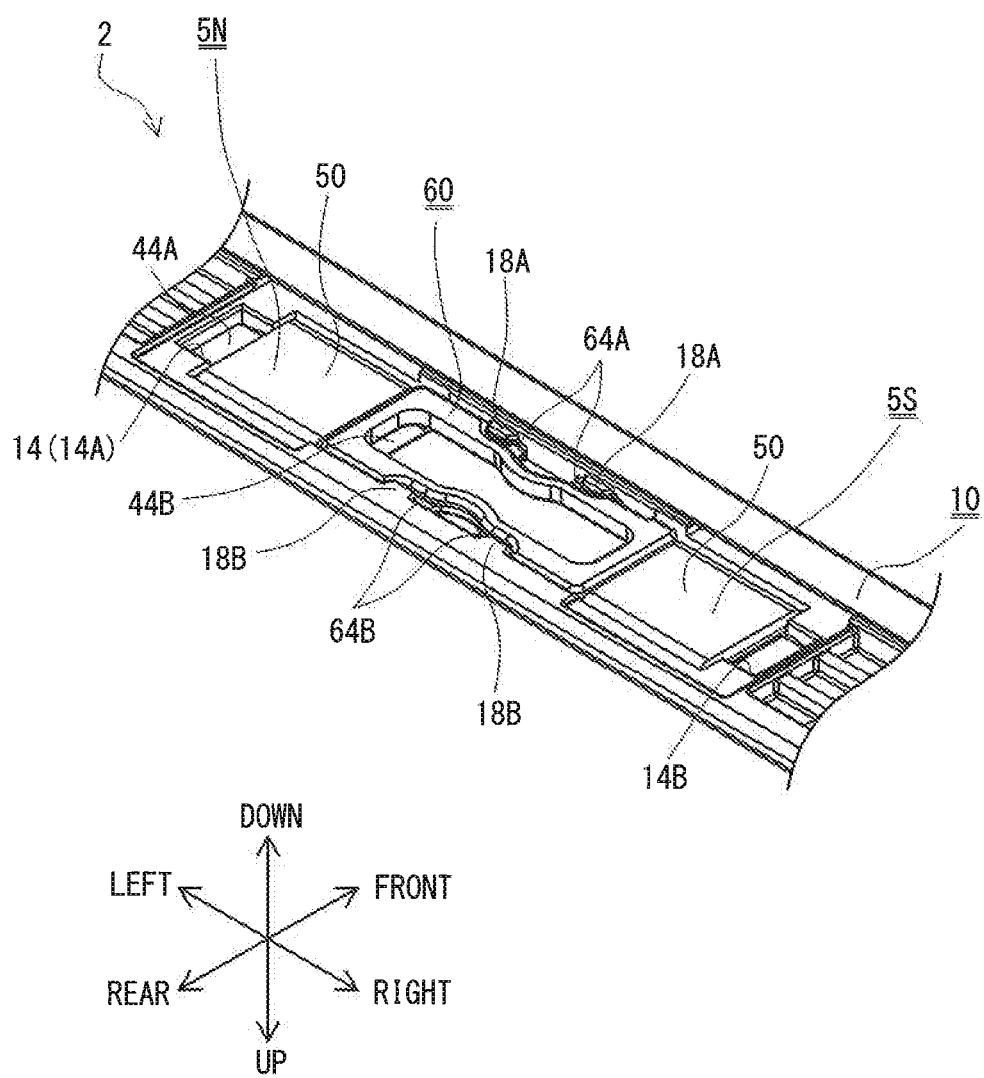
FIG. 4 is a perspective view of the portion encircled by the dashed line shown in FIG. 2 viewed from below.

The assembly of the frame body 2 will now be described with reference to FIG. 3. The method for fixing the magnetic units 5N and 5S and the fastener 60 to the frame side portion 10 is the same, so the method for fixing the magnet unit 5N and the fastener 60 to the frame side portion 10 will be described. The magnet member 30 is inserted into the accommodation slot 42 of the fixing frame 40 in a position with the upper surface 32 facing the fixing frame 40. Then, the magnet member 30 and the fixing frame 40 are inserted into the opening 52 of the yoke 50 in a position with the lower surface 34 facing the yoke 50. Then, with the magnet unit 5N, the fixing frame 40 is inserted into the through-hole 12K with the fixing portion 44A in a position inserted into the opening 14A of the frame side portion 10, and the fixing portion 44B in a position inserted into the opening 16 of the frame side portion 10. Similarly, with the magnet unit 5S as well, the fixing frame 40 is inserted into the through-hole 12J with the fixing portion 44A in a position inserted into the opening 14B of the frame side portion 10, and the fixing portion 44B in a position inserted into the opening 16 of the frame side portion 10. Next, the fastener 60 is inserted into the opening 16 of the frame side portion 10 in a state where the deformed portion 62A of the fastener 60 is pressed and deformed rearward and the deformed portion 62B is pressed and deformed forward. In this state, when the pressing and deforming of the deformed portions 62A and 62B are released, the retaining tab 64A is consequently inserted above the retaining tab 18A of the frame side portion 10, and the retaining tab 64B is consequently inserted above the retaining tab 18B, as illustrated in FIG. 4. The magnetic units 5N and 5S, and the fastener 60 are fixed to the frame side portion 10 by the retaining tabs 64A and 64B being inserted above the retaining tabs 18A and 18B.

As described above, the magnet units 5N and 5S fixed to the frame side portion 10 are arranged such that the orientations of the magnetic fields of adjacent magnet units 5N and 5S on the upper surface 11 of the frame side portion 10 are reversed from each other as illustrated in FIG. 2. More specifically, on the frame side portion 10A, the S-pole of the magnet unit 5S inserted into the through-hole 12A is exposed from the upper surface 11 of the frame side portion 10A, and the N-pole of the magnet unit 5N inserted into the through-hole 12B is exposed from the upper surface 11. The S-pole of the magnet unit 5S inserted into the through-hole 12C is exposed from the upper surface 11, and the N-pole of the magnet unit 5N inserted into the through-hole 12D is exposed from the upper surface 11. On the frame side portion 10B, the S-pole of the magnet unit 5S inserted into the through-hole 12E is exposed from the upper surface 11 of the frame side portion 10B, and the N-pole of the magnet unit 5N inserted into the through-hole 12F is exposed from the upper surface 11. That is, when the frame body 2 is viewed from above, the 12 magnet units 5N and 5S are arranged such that the N-poles and the S-poles are alternately exposed in the clockwise direction.

Structure of the Holder 3

Figure 5:
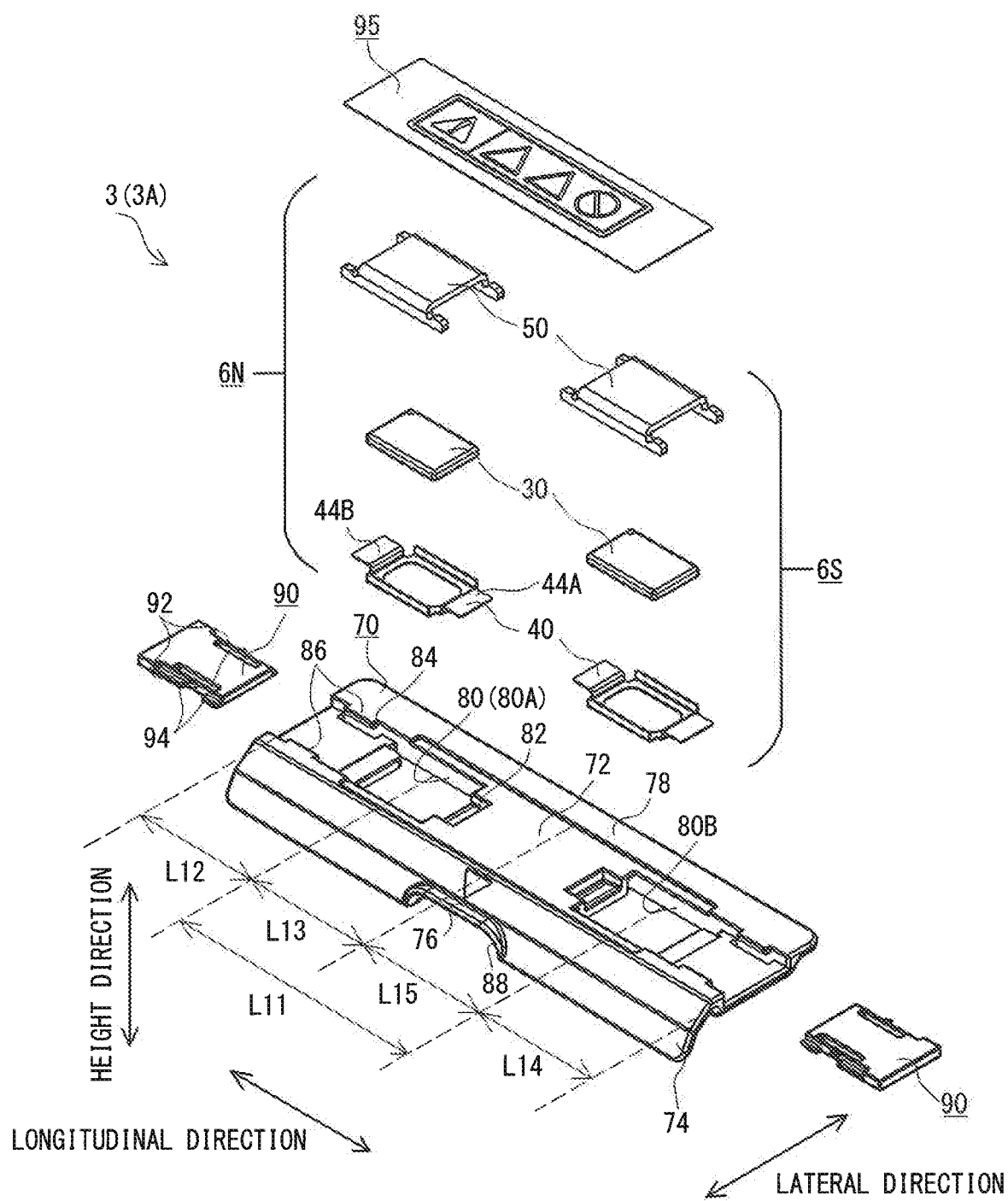
FIG. 5 is an exploded perspective view of a holder viewed from above.

The detailed structure of the holder 3 will now be described with reference to FIG. 5 to FIG. 7. Two types of holders 3A and 3B have the same structure except for that the length in the longitudinal direction is different, as illustrated in FIG. 1, so the holder 3A will be representatively described. When a holder, of the holders 3A and 3B, is not specified, or when the holders are referred to collectively, the term "holder 3" will be used. As illustrated in FIG. 5, the holder 3A includes a holder base plate 70, magnet units 6N and 6S, a fastener 90, and a sticker 95. The magnet units 6N and 6S have the same configuration as the magnet member 30, the fixing frame 40, and the yoke 50 included in the frame body 2, so these members will be referred to using the same numbers, and descriptions thereof will be omitted.

Structure of the Holding Base Plate 70

The holding base plate 70 is molded from non-magnetic material such as plastic. The holding base plate 70 has a substantially L-shaped cross section, as illustrated in FIG. 7. The holding base plate 70 includes a base portion 72, a protrusion portion 74, and grasping portions 76 and 78. The base portion 72 is a flat plate-shaped portion that extends in the longitudinal direction. As illustrated in FIG. 6, a lower surface 73 of the base portion 72 is a flat surface. Two through-holes 80A and 80B that pass through in the height direction, as illustrated in FIG. 5, are formed in the base portion 72. The two through-holes 80A and 80B in the base portion 72 are arranged in a line in the longitudinal direction. The two through-holes 80A and 80B have the same shape, so when a through-hole is not specified or the through-holes are referred to collectively, the term "through-hole 80" will be used.

The distance L11 between the center of the through-hole 80A and the center of the through-hole 80B in the equal to the distance L1 between the center of the through-hole 12A and the center of the through-hole 12B of the frame body 2. The distance L12 between the center of the through-hole 80A and the end portion of the base portion 72 is shorter than the distance L13 between the center of the through-hole 80A and the center of the base portion 72. The distance L14 between the center of the through-hole 80B and the end portion of the base portion 72 is equal to the distance L12. The distance L15 between the center of the through-hole 80B and the center of the base portion 72 is equal to the distance L13. That is, the two through-holes 80A and 80B are arranged axisymmetrical in the longitudinal direction with respect to a center line in the lateral direction that passes through the center of base portion 72.

Openings 82 and 84 that open upward in the height direction are formed in an upper surface of the holder base plate 70 and are communicated with the through-hole 80. The height direction in FIG. 5 and FIG. 7 corresponds to the up-down direction in FIG. 1. All of the through-holes 80 have the same configuration, so through-hole 80A will be representatively described. The opening 82 is arranged on the center side of the base portion 72, in the through-hole 80A in the longitudinal direction, and the opening 84 is arranged on the end portion side of the base portion 72, in the through-hole 80A in the longitudinal direction. The opening 84 is formed extending between the through-hole 80A and the end portion of the base portion 72, and is defined by two side walls extending in the longitudinal direction of the base portion 72. Two retaining tabs 86 that protrude inside the opening 84 are formed on the two side walls of the frame side portion 72 that define the opening 84.

The protrusion portion 74 extends downward from one end of the base portion 72 in the lateral direction. An opening 88 opens downward in a center portion of the protrusion portion 74 in the longitudinal direction. The grasping portion 76 protrudes in the lateral direction from the side surface of the center portion of the protrusion portion 74 where the opening 88 is arranged, as illustrated in FIG. 7. That is, the grasping portion 76 protrudes in the direction toward the inner area A1 from the side surface of the protrusion portion 74. The grasping portion 78 protrudes in the lateral direction from the other end of the base portion 72 in the lateral direction. That is, the grasping portion 78 protrudes in the direction away from the inner area A1 from the protrusion portion 72.

Structure of the Fastener 90

The fastener 90 is molded in a square shape from non-magnetic material such as plastic. Two protrusion portions 92 and two retaining tabs 94 protrude one each from each side of the fastener 90 in the lateral direction, as illustrated in FIG. 5. The two protrusion portions 92 are arranged on the lower end of the fastener 90. The two retaining tabs 94 are arranged on the upper end of the fastener 90.

Structure of the Sticker 95

The sticker 95 is formed in a thin film shape from non-magnetic material such as plastic, and extends in the longitudinal direction. An adhesive is applied to a lower surface of the sticker 95, and precautions for the user, such as magnet handling precautions, are printed on the upper surface of the sticker 95.

Assembly of the Holder 3

The assembly of the holder 3 will now be described with reference to FIG. 5. The method for fixing the magnet units 6N and 6S and the fastener 90 to the holder base plate 70 is the same. Because the method for fixing the magnetic units 6N and 6S is the same, the method for fixing the magnet unit 6N and the fastener 90 to the holder base plate 70 will be representatively described. With the magnet unit 6N, the fixing portion 44A is inserted into the opening 82 of the holder base plate 70, and the fixing portion 44B is inserted into the opening 84 of the holder base plate 70. The magnet unit 6N is inserted into the through-hole 80A by inserting these into the openings. Next, the fastener 90 is inserted into the opening 84 from an end portion of the holder base plate 70 in the longitudinal direction. At this time, the retaining tab 94 of the fastener 90 is arranged below the retaining tab 86 of the holder base plate 70, and the magnet unit 6N and the fastener 90 are fixed to the holder base plate 70 by the retaining tab 86 and the retaining tab 94 contacting each other. The magnet unit 6S is also fixed to the holder base plate 70 in the same way, and then the sticker 95 is affixed to the upper surface of the holder base plate 70.

Figure 6:
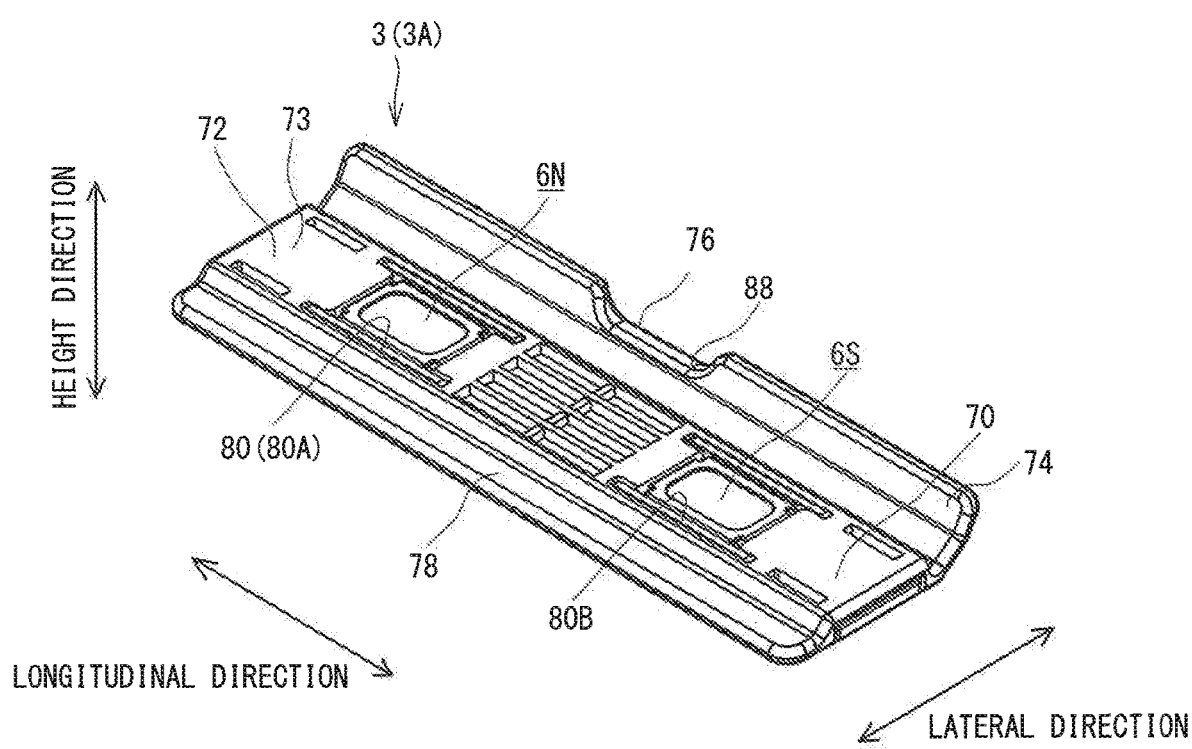
FIG. 6 is a perspective view of the holder viewed from below.

As described above, the magnet units 6N and 6S that are fixed to the holder base plate 70 are exposed from the lower surface 73 of the holder base plate 70, as illustrated in FIG. 6, and are arranged such that the orientations of the magnetic fields of adjacent magnet units 6N and 6S are reversed from each other. That is, the magnet unit 6N inserted into the through-hole 80A is arranged such that the N-pole is exposed from the lower surface 73, and the magnet unit 6S inserted into the through-hole 80B is arranged such that the S-pole is exposed from the lower surface 73.

Operation and Effect of the Holding Frame 1

The operation and effect of the holding frame 1 configured as described above will now be described with reference to FIG. 2 and FIG. 7.

Operation to Attach a Cloth 8 to the Holding Frame 1

In a state with the holder 3 removed from the frame body 2, the user places the cloth 8 on the frame body 2 such that the sewing area of the cloth 8 that serves as the medium to be held is arranged inside the inner area A1 of the frame body 2 illustrated in FIG. 2. The sewing area is the area of the cloth 8 that the user wants to sew. After placing the cloth 8 on the frame body 2, the user attaches two of the holders 3A, one each, to the frame side portion 10A and the frame side portion 10C from above the cloth 8, as illustrated in FIG. 1. Also, the user attaches one of the holders 3B to each of the frame side portions 10B and 10D from above the cloth 8. That is, a maximum of six of the holders 3 are attached to the frame forming portion 4. The positions in which the holders 3 are attached to the frame side portion 10 are all the same, so the position in which the holder 3A is attached to the frame side portion 10A will representatively be described. In a state where the protrusion portion 74 of the holder 3A is arranged in the inner area A1, the holder 3A is arranged on the frame side portion 10A such that the magnet units 5S and 5N of the frame side portion 10A face the magnet units 6N and 6S of the holder 3A, respectively. At this time, the S-pole of the magnet unit 5S in the through-hole 12A is exposed from the upper surface 11 of the frame side portion 10A, and the N-pole of the magnet unit 6N in the through-hole 80A is exposed from the lower surface 73, so mutually attracting magnetic forces are generated. The N-pole of the magnet unit 5N inserted into the through-hole 12B is exposed from the upper surface 11 of the frame side portion 10A, and the S-pole of the magnet unit 6S inserted into the through-hole 80A is exposed from the lower surface 73, so mutually attracting magnetic force are generated. Therefore, the magnet units 6N and 6S of the through-holes 80A and 80B are accurately positioned in positions vertically above the magnet units 5S and 5N of the through-holes 12A and 12B by the attracting magnetic forces. The holder 3A and the frame side portion 10A hold the cloth 8 by these attracting magnetic forces.

As illustrated in FIG. 7, in a state where the frame side portion 10 and the holder 3 are holding the cloth 8, a lower end 75 of the protrusion portion 74 protrudes farther downward than the lower surface 73 of the holder base plate 70, so the lower end 75 presses the cloth 8 downward.

If the user attempts to arrange the holder 3 in a position different from the arrangement position of the holder 3 and the frame side portion 10 described above, repelling magnetic forces are generated between the holder 3 and the frame side portion 10. For example, if the holder 3A is arranged displaced to the right with respect to the arrangement position of the holder 3A and the frame side portion 10A described above, i.e., if the magnet unit 6N in the through-hole 80A illustrated in FIG. 6 is arranged close to the magnet unit 5N in the through-hole 12B illustrated in FIG. 2, repelling magnetic forces will be generated between the magnet unit 5N and the magnet unit 6N. Therefore, it becomes difficult to arrange the holder 3A on the frame side portion 10A. Also, if the magnet units 5S and 5N in the through-holes 12A and 12B are arranged facing the magnet units 6S and 6N in the through-holes 80B and 80A when the protrusion portion 74 of the holder 3A is arranged behind the base portion 72 with respect to the frame side portion 10A illustrated in FIG. 2, the magnet unit 5S will face the magnet unit 6S, and the magnet unit 5N will face the magnet unit 6N. That is, repelling magnetic forces are generated between the holder 3A and the frame side portion 10A, so it becomes difficult to arrange the holder 3A on the frame side portion 10A.

Operation to Remove the Cloth 8 from the Holding Frame 1

The user is able to release the hold by the holding frame 1 on the cloth 8 and remove the cloth 8 from the holding frame 1 by removing all of the holders 3 from the frame side portion 10. In a state in which the frame side portion 10 and the holder 3 are holding the cloth 8, as illustrated in FIG. 7, the user inserts their fingertips through the opening 88 in the holder 3 and grasps the grasping portion 76. Alternatively, the user grasps the grasping portion 78 arranged at an interval above the upper surface 11 of the frame side portion 10. Then, the user moves the holder 3 upward with respect to the frame side portion 10, and as a result, the holder 3 detaches from the frame side portion 10.

Effect of the Holding Frame 1

The S-pole of the magnet unit 5S in the through-hole 12A and the N-pole of the magnet unit 6N in the through-hole 80A face each other in the up-down direction, so attracting magnetic forces are generated. However, if the holder 3A is displaced to the right with respect to the through-hole 12A, the N-pole of the magnetic unit 5N in the through-hole 12B will become closer to the N-pole of the magnetic unit 6N in the through-hole 80A, and repelling magnetic forces will be generated. That is, the holder 3A can only be attached in a specific position on the frame side portion 10A where attracting magnetic forces will be generated between the holder 3A and the frame side portion 10A, so the user is able to easily attach the holder 3A in the specific position, thereby enabling the cloth 8 to be spread out on the holding frame 1 with suitable tension.

The magnet unit 5S in the through-hole 12A is formed by a single magnet member 30. The magnet unit 5N in the through-hole 12B, which is arranged at an interval from the through-hole 12A, is formed by a single magnet member 30. In this case, the number of magnet members used can be reduced compared to a case where the magnet unit 5S in the through-hole 12A and the magnet unit 5N in the through-hole 12B are formed by an S-pole and an N-pole of a single magnet member, so the holding frame 1 can be manufactured at a lower cost. Also, the size of each magnet member can be reduced, so cracking of the magnet member 30 due to localized bending stress acting on the frame forming portion 4 from attaching and removing the holder 3 to and from the frame body 2 can be reduced.

If the holder 3 is attached to the frame side portion 10 illustrated in FIG. 2 in the wrong position, more specifically, if the protrusion portion 74 of the holder 3 is positioned outside the inner area A1 and the magnet units 5S and 5N of the frame side portion 10 and the magnet units 6S and 6N of the holder 3 face each other in the up-down direction, repelling magnetic forces will be generated between the magnet unit 5S and the magnet unit 6S. Therefore, the direction in which the holder 3 attaches to the frame side portion 10 is unambiguously determined in the front-rear direction, which reduces the likelihood of the user attaching the holder 3 in the wrong direction.

For example, a configuration in which three magnet units 6N1, 6S, and 6N2 are arranged in a row on the holder 3, and three magnet units 5S1, 5N, and 5S2 are arranged in a row in the frame side portion 10 is one conceivable configuration (not shown in the drawings). In this example configuration, if the holder 3 is attached to the frame side portion 10 in the correct attachment state in which the protrusion portion 74 of the holder 3 is positioned inside the inner area A1, the magnet units 5S1, 5N, and 5S2 will face the magnet units 6N1, 6S, and 6N2 in the up-down direction, so mutually attracting magnetic forces will be generated. However, in the example configuration, even if the holder 3 is attached to the frame side portion 10 in a wrong attachment state in which the protrusion portion 74 of the holder 3 is outside the inner area A1, the magnet units 5S1, 5N, and 5S2 and the magnet units 6N2, 6S, and 6N1 will face each other in the up-down direction, so mutually attracting magnetic forces will be generated. That is, in the foregoing example configuration, the user could attach the holder 3 in the wrong direction. In contrast, with a configuration in which an even number of magnetic units 6N and 6S are attached to an even number of magnet units 5S and 5N of the same number as the magnet units 6N and 6S, as in the embodiment, it is possible to reduce the likelihood of the user attaching the holder 3 in the wrong direction.

Also, for example, a configuration in which four magnet units 6N1, 6S1, 6N2, and 6S2 are arranged in a row on the holder 3, and four magnet units 5S1, 5N1, 5S2, and 5N2 are arranged in a row in the frame side portion 10 is another conceivable configuration (not shown in the drawings). In this other example configuration, if the holder 3 is attached to the frame side portion 10 in the correct attaching state in which the protrusion portion 74 of the holder 3 is positioned inside the inner area A1, the four magnet units 5S1, 5N1, 5S2, and 5N2 of the frame side portion 10 will face the four magnet units 6N1, 6S1, 6N2, and 6S2 of the holder 3 in the up-down direction, so mutually attracting magnetic forces will be generated. However, with this other example configuration, even if the holder 3 is attached offset in the longitudinal direction to the frame side portion 10 in a state in which the protrusion portion 74 of the holder 3 is inside the inner area A1, two of the magnet units 5N1 and 5S1, from among the four magnet units of the frame side portion 10, will face two of the magnet units 6S2 and 6N2, from among the four magnet units of the holder 3, in the up-down direction, so mutually attracting magnetic forces will be generated. That is, in this other example configuration, the user could attach the holder 3 in the wrong attachment position in the longitudinal direction of the frame side portion 10. In contrast, with a configuration in which at least two, which is the smallest even number, of the magnet units 6N and 6S, are attached to two of magnet units 5S and 5N, as in the embodiment, it is possible to reduce the likelihood of the user attaching the holder 3 in the wrong attachment position.

The grasping portions 76 and 78 are formed so as to protrude farther in the lateral direction than the frame side portion 10, or the grasping portion 78 is formed so as to be positioned at an interval above the upper surface 11 of the frame side portion 10, when the holder 3 is attached to the frame side portion 10. Thus, the user is able to easily remove the holder 3 from the frame side portion 10 by grasping the grasping portions 76 and 78.

With the frame side portion 10A, the distance L3 is shorter than the distance L1. That is, the magnet unit 5S in the through-hole 12A is arranged closer to the end portion than to the center of the frame side portion 10A, so the portion of the cloth 8 positioned near the end portion of the frame side portion 10A can be held by the holder 3A and the frame side portion 10A. Therefore, the portion of the cloth 8 positioned near the end portion of the frame side portion 10A can also be spread out on the holding frame 1 with suitable tension.

The distance L1 and the distance L2 of the frame side portion 10A and the distance L11 of the holder 3A are equal, so the holder 3A can not only be attached to the magnet units 5S and 5N in the through-holes 12A and 12B, but also to the magnet units 5S and 5N in the through-holes 12C and 12D.

If six of the holders 3, which is the maximum number that can be attached to the frame forming portion 4, are attached, the cloth 8 is held over a wide area by the six holders 3 and the frame forming portion 4, so the cloth 8 can be spread out on the holding frame 1 with suitable tension.

The upper surface 11 of the frame side portion 10 and the lower surface 32 of the holder 3 are parallel flat surfaces in the front-rear direction and the left-right direction, so the thickness of the frame side portion 10 in the up-down direction and the thickness of the holder 3 in the up-down direction can be thinner than when the upper surface 11 and the lower surface 32 are flat surfaces that extend in a direction intersecting the front-rear direction or the left-right direction. Therefore, when the cloth 8 is held by the frame side portion 10 and the holder 3, the user can easily insert the holding frame 1 between a bed portion of the sewing machine and a presser foot that moves up and down.

The magnet units 5S and 5N are fixed to the frame side portion 10 with the fastener 60, so the thickness of the frame side portion 10 in the up-down direction can be thinner than when the magnet units 5S and 5N are fixed to the frame side portion 10 with screws. The magnet units 6S and 6N are fixed to the holder base plate 70 with the fastener 90, so the thickness of the holder 3 in the height direction can be thinner than when the magnet units 6S and 6N are fixed to the holder base plate 70 with screws. Therefore, when the cloth 8 is held by the frame side portion 10 and the holder 3, the user can easily insert the holding frame 1 between the bed portion of the sewing machine and the presser foot that moves up and down.

With the holder 3A, the distance L12 is shorter than the distance L13. That is, the magnet unit 6N in the through-hole 80A is arranged closer to the end portion than to the center of the holder 3A, so the portion of the cloth 8 positioned near the end portion of the holder 3A can be held by the holder 3A and the frame side portion 10A. Therefore, the portion of the cloth 8 positioned near the end portion of holder 3A can also be spread out on the holding frame 1 with suitable tension.

Modified Examples

The present disclosure is not limited to the embodiments described above, various modifications may be made without departing from the scope of thereof.

(1) In the embodiment, the configuration is such that two of the magnet units 6N and 6S of the holder 3 are attached to two of the magnet units 5S and 5N of the frame side portion 10, as illustrated in FIG. 2 and FIG. 6. However, the holder 3 may be provided with a plurality of three or more of the magnet units 6N and 6S, and this holder 3 may be attached to a plurality of three or more of the magnet units 5S and 5N of the frame side portion 10. With this configuration as well, the orientations of the magnetic fields of the adjacent magnet units 5N, 5S, 6N, and 6S are arranged reversed in the frame side portion 10 and the holder 3, so if the holder 3 is displaced in the longitudinal direction with respect to the frame side portion 10, the magnet units 6N and 6S of the holder 3 will face the magnet units 5N and 5S of the frame side portion 10 in the up-down direction, and repelling magnetic forces will be generated. That is, the holder 3 can only be attached to the frame side portion 10 in a specific position where attracting magnetic forces will be generated between the holder 3 and the frame side portion 10. Therefore, the user can easily attach the holder 3 in a specific position, and can easily spread out the cloth 8 on the holding frame 1 with suitable tension.

(2) In the embodiment, the configuration is such that two of the magnet units 6N and 6S of the holder 3 are attached to two of the magnet units 5S and 5N of the frame side portion 10, as illustrated in FIG. 2 and FIG. 6. However, the holder 3 may be provided with an even number of four or more of the magnet units 6N and 6S, and this holder 3 may be attached to an even number of four or more of the magnet units 5S and 5N of the frame side portion 10. With this configuration as well, if the protrusion portion 74 is positioned behind the base portion 72 and the magnet units 5S and 5N of the frame side portion 10 face the magnet units 6N and 6S of the holder 3 in the up-down direction, repelling magnetic forces will be generated between the magnet unit 5S and 5N of the frame side portion 10 and the magnet unit 6N and 6S of the holder 3. Therefore, the direction in which the holder 3 attaches to the frame side portion 10 is unambiguously determined in the front-rear direction, which reduces the likelihood of the user attaching the holder 3 in the wrong direction.

(3) In the embodiment, the configuration is such that two of the magnet units 6N and 6S of the holder 3 are attached to two of the magnet units 5S and 5N of the frame side portion 10, as illustrated in FIG. 2 and FIG. 6. However, the holder 3 may be provided with three of the magnet units 6N, 6N, and 6S in this order, and this holder 3 may be attached to three of the magnet units 5S, 5S, and 5N of the frame side portion 10. Also, a plurality of magnet units provided on the holder 3 may all be the magnet unit 6N, and a plurality of the magnet units provided on the frame side portion 10 may all be the magnet unit 5S. That is, only the N-pole may be exposed from the lower surface 73 of the holder 3, and only the S-pole may be exposed from the upper surface 11 of the frame side portion 10, and this holder 3 may be attached to the frame side portion 10. With this kind of configuration as well, the holder 3 can only be attached to the frame side portion 10 in a specific position where attracting magnetic forces will be generated between the holder 3 and the frame side portion 10. Therefore, the user can easily attach the holder 3 in a specific position, and can easily spread out the cloth 8 on the holding frame 1 with suitable tension.

Figure 8:
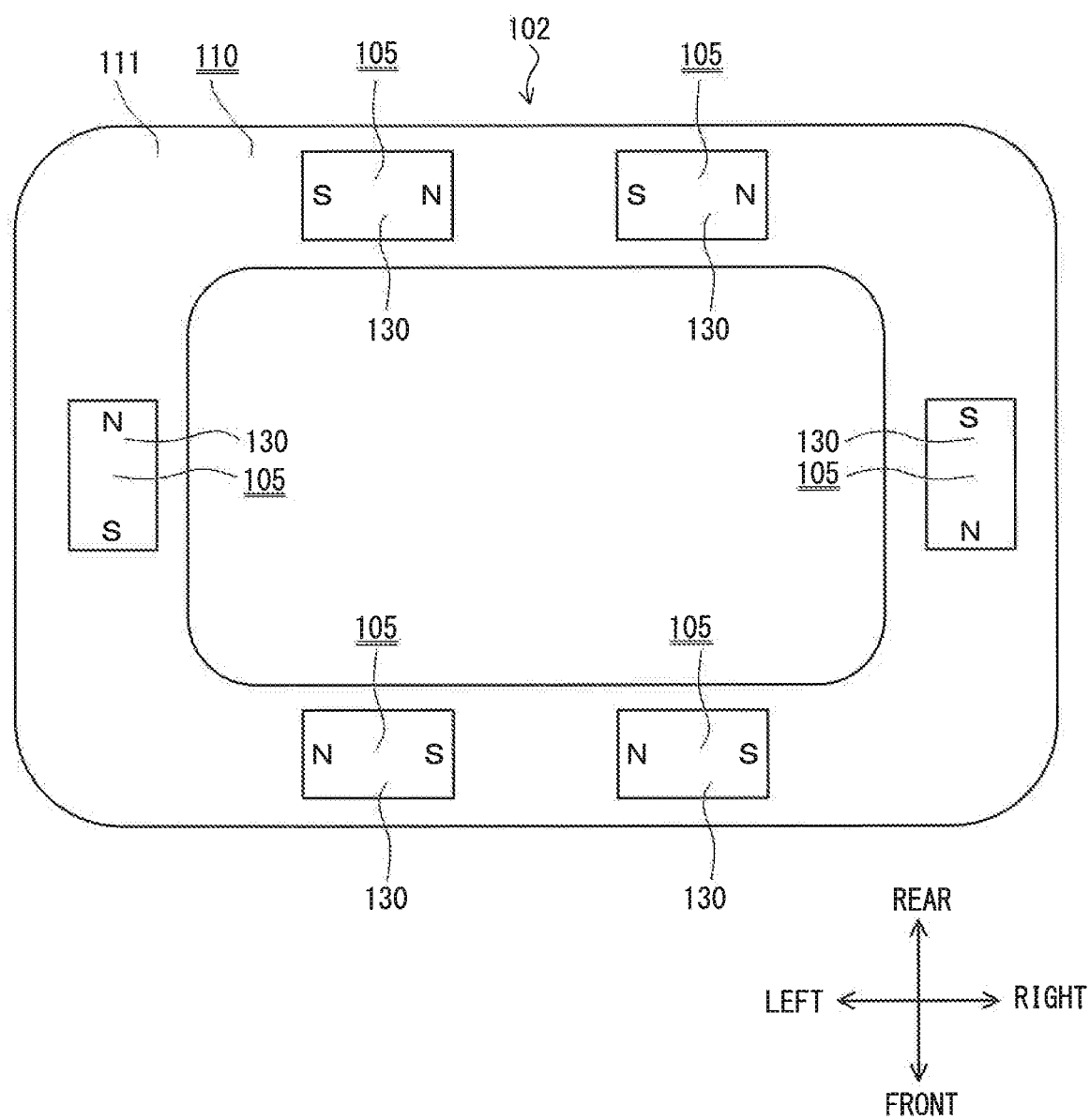
FIG. 8 is a plan view of a frame body according to a modified example.

(4) In the embodiment, the configuration is such that the magnet units 5N and 5S that are exposed from the upper surface 11 of the frame side portion 10 are each formed by one of the magnet members 30 as illustrated in FIG. 2. However, like a frame body 102 illustrated in FIG. 8, the S-pole and the N-pole of a magnet unit 105 that are exposed from an upper surface 111 of a frame side portion 110 may be formed by a single magnet member 130. In the up-down direction that is a direction orthogonal to the upper surface 111, the orientation of the magnetic field generated by the S-pole of the magnet unit 105 and the orientation of the magnetic field generated by the N-pole of the magnet unit 105 will be reversed from each other. In this case, the number of magnet members, the number of fixing frames, the number of yokes, and the number of fasteners are reduced compared to the frame body 2. Therefore, the number of components is reduced, so the frame body 102 can be manufactured easily. Also, in the embodiment, the N-pole and the S-pole that are exposed from the lower surface 73 of the fastener 3 are each formed by one of the magnet members 30, as illustrated in FIG. 6, but the N-pole and the S-pole that are exposed from the lower surface of the holder may be formed by a single magnet member. In this case, the number of magnet members, the number of fixing frames, the number of yokes, and the number of fasteners are reduced compared to holder 3. Therefore, the number of components is reduced, so the holder can be manufactured easily.

Figure 9:
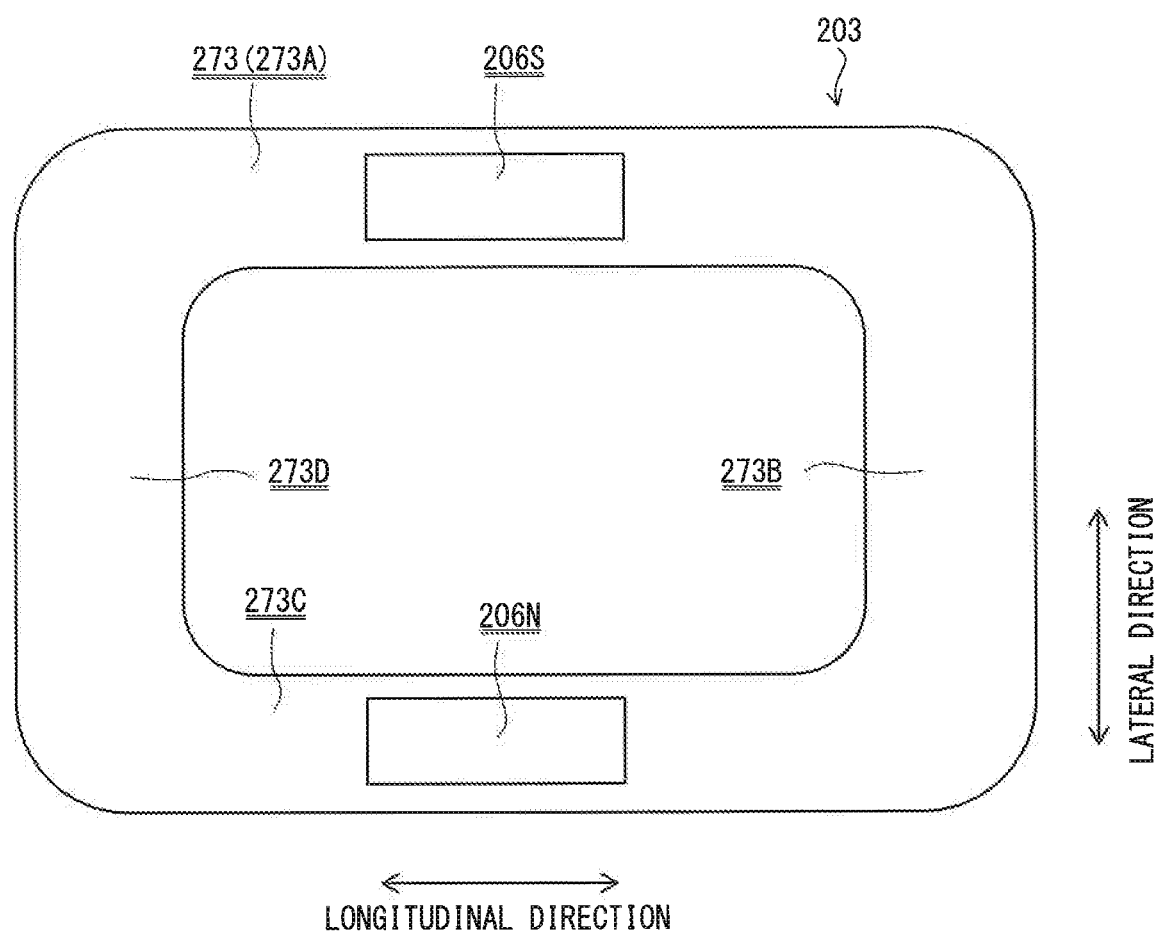
FIG. 9 is a bottom view of a holder according to a modified example.

(5) In the embodiment, the configuration is such that a plurality of holders 3 are attached to the frame forming portion 4, as illustrated in FIG. 1, but a single holder formed in the same annular shape as the frame forming portion 4 may alternatively be attached to the frame forming portion 4. Also, the configuration is such that the holder 3 is attached to the plurality of magnet units 5S and 5N of a single frame side portion 10, as illustrated in FIG. 1, but one magnet unit 206S and 206N may alternatively be arranged on each of lower surfaces 273A and 273C, respectively, that extend in the longitudinal direction, in a holder 203 formed in the same annular shape as the frame forming portion, as illustrated in FIG. 9. In this case, the magnet unit 206S arranged on the lower surface 273A may be arranged such that the S-pole is exposed from the lower surface 273A, and the magnet unit 206N arranged on the lower surface 273C may be arranged such that the N-pole is exposed from the lower surface 273C. Also, one magnet unit 206N and 206S may be arranged one each of the lower surface 273B and the lower surface 273D, respectively. With regards to the frame forming portion to which the holder 203 can be attached, one magnet unit may be arranged on one frame side portion. In this case as well, the holder 203 can only be attached to the frame forming portion in a specific position where attracting magnetic forces will be generated between the holder 203 and the frame side portion. Therefore, the user can easily attach the holder 203 in a specific position, and can easily spread the cloth 8 on the holding frame 1 with suitable tension.

(6) In the embodiment, the configuration is such that the sum of the distance L8 and the distance L10 is longer than the distance L1, but the sum of the distance L8 and the distance L10 may alternatively be equal to the distance L1 as illustrated in FIG. 2. In this case, the holder 3A can be attached to the frame side portions 10B and 10D, so it is no longer necessary to manufacture the holder 3B that is of a different length in the longitudinal direction. Also, the user can attach the holder 3A to either of the frame side portions 10A or 10B, so it is possible to inhibit the holder 3 from being wrongly attached compared to when there are holders 3A and 3B of different lengths.

(7) In the embodiment, the configuration is such that the holder 3 is attached to the frame forming portion 4 that has a square shape as illustrated in FIG. 1, but the frame forming portion may alternatively have a polygonal shape such as a triangle or a pentagon, or an annular shape such as circular or oblong. Also, the frame side portion 10 extends in a straight line, but it may alternatively be curved. With a curved frame side portion, the holder 3 may also be curved matching the shape of the frame side portion.

Figure 10:
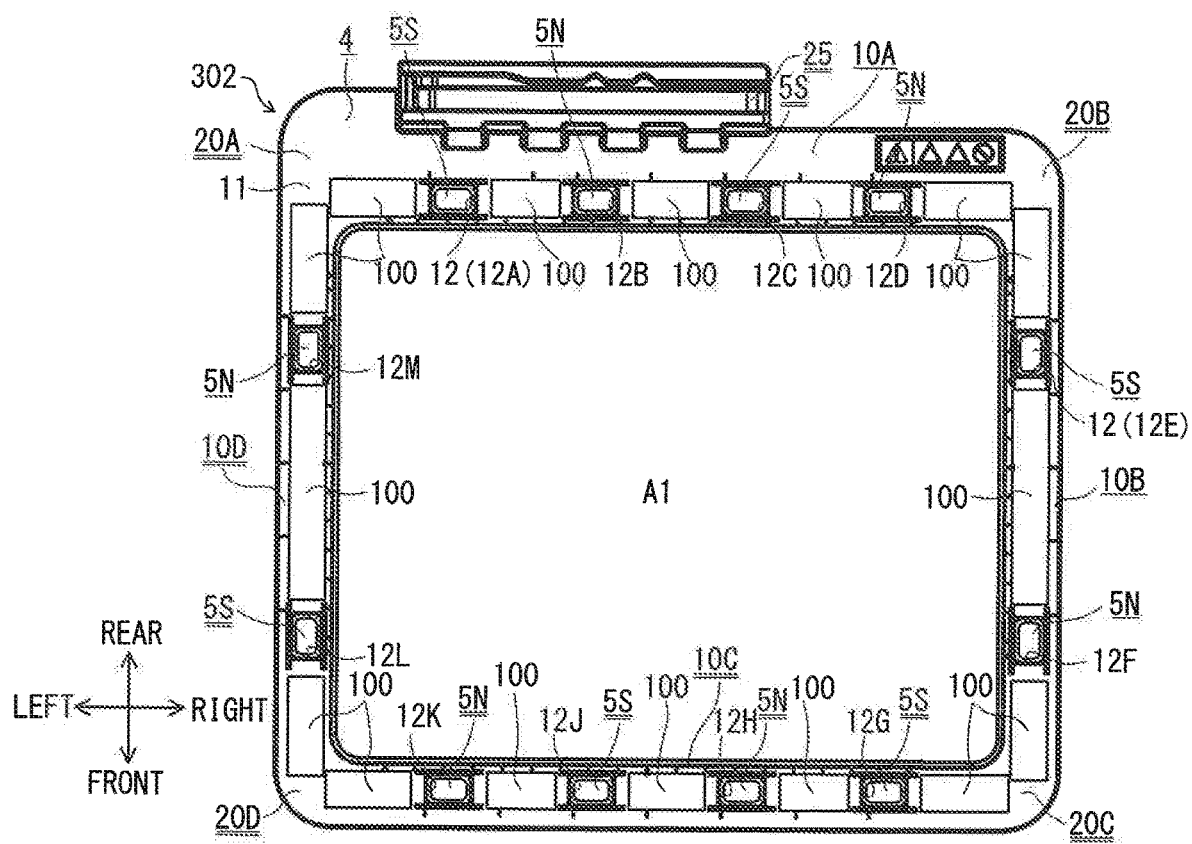
FIG. 10 is a plan view of a frame body according to another modified example.

(8) In the embodiment, the configuration is such that the upper surface 11 of the frame forming portion 4 and the lower surface 73 of the holder 3 hold the cloth 8, as illustrated in FIG. 1. However, a non-slip portion 100 made of an adhesive sheet such as urethane gel, a lint brush, or rubber or the like that generates a large amount of friction may be arranged on the upper surface 11 of the frame forming portion 4 of a frame body 302, as illustrated in FIG. 10. Constituent portions of the frame body 302 that are the same as those of the frame body 2 illustrated in FIG. 1 will be illustrated denoted by the same reference characters. The non-slip portion 100 may be arranged on the lower surface 73 of the holder 3. Arranging the non-slip portion 100 enables a state in which the cloth 8 is spread out with suitable tension to be easily maintained by not only the attracting magnetic forces between the magnet units 6N and 6S of the holder 3 and the magnet units 5S and 5N of the frame forming portion 4, but also by the cloth 8 being held on the holding frame 1 by friction between the non-slip portion 100 and the cloth 8, in a state in which the cloth 8 is held between the holder 3 and the frame forming portion 4. Also, the non-slip portion 100 may be arranged on the upper surface 11 of the connection portion 20, or on the upper surface 11 near the end portion of the frame side portion 10. The connection portion 20 is greatly bent so the holder 3 is not able to be attached to the upper surface 11 of the connection portion 20 or the upper surface 11 near the end portion of the frame side portion 10. Therefore, the friction between the non-skip portion 100 and the cloth 8 keeps the cloth 8 on the holding frame 1, so the cloth 8 can easily be kept in a state spread out with suitable tension. On the upper surface 11 of the frame forming portion 4, the surface of the non-slip portion 100 and the surfaces of the magnet units 5S and 5N may be arranged so as to be flush. On the lower surface 73 of the holder 3, the surface of the non-slip portion 100 and the surfaces of the magnet units 6S and 6N may be arranged so as to be flush.

(9) In the embodiment, the configuration is such that the holding frame 1 holds the cloth 8, as illustrated in FIG. 7, but leather, a resin sheet, or paper may alternatively be held, as the medium to be held, by the holding frame 1. Also, the holding frame 1 holding the medium to be held is attached to a sewing machine, and sewing is performed on the medium to be held, but the holding frame 1 holding the medium to be held may be attached to a printer and an image may be printed on the medium to be held. Also, the holding frame 1 holding the medium to be held may be attached to a cutting device, and the medium to be held may be cut on the basis of drawing data. That is, the holding frame 1 holding the medium to be held need only be attached to processing equipment, and the processing equipment need only process the medium to be held.

What is claimed is:

1. A holding frame for holding a medium, comprising:
a frame forming portion having a first magnet and a placement surface on which the medium is configured to be placed, the first magnet being arranged along the placement surface, the frame forming portion having an annular shape, and having a plurality of first magnetic field generation portions generating magnetic fields with the first magnet, the first magnet being arranged on the frame forming portion so that the orientations of the magnetic fields of the plurality of first magnetic field generation portions that are adjacent are reversed from each other on the placement surface;
at least one holder corresponding to a partial part of the frame forming portion that sandwiches the medium to be held and not an entire part of the frame forming portion that sandwiches the medium to be held, the at least one holder having a holding surface and a second magnet, the holding surface sandwiching, with the placement surface, the medium, the second magnet being arranged along the holding surface, each holder of the at least one holder having a plurality of second magnetic field generation portions generating magnetic fields with the second magnet, the second magnet being arranged in each holder so that the orientations of the magnetic fields of the plurality of second magnetic field generation portions that are adjacent are reversed from each other on the holding surface, and in a state in which each holder is attached to the frame forming portion, the plurality of first magnetic field generation portions and the plurality of second magnetic field generation portions facing each other, and the orientations of the magnetic fields of the plurality of first magnetic field generation portions being the same as the orientations of the magnetic fields of the plurality of second magnetic field generation portions;
a fixing frame accommodating the second magnet; and
a fastener including a retaining tab, the fixing frame being fixed to the holder with the retaining tab of the fastener.

2. The holding frame according to claim 1, wherein
the first magnet is a plurality of frame magnet members aligned at intervals on the frame forming portion,
one of the first magnetic field generation portions of the plurality of first magnetic field generation portions is formed by one frame magnet member of the plurality of frame magnet members,
the second magnet is a plurality of holder magnet members aligned at intervals on each holder, and
one of the second magnetic field generation portions of the plurality of second magnetic field generation portions is formed by one holder magnet member of the plurality of holder magnet members.

3. The holding frame according to claim 1, wherein
the frame forming portion defines an inner area in directions in which the medium is to be spread out, the plurality of first magnetic field generation portions is an even number of first magnetic field generation portions, the plurality of second magnetic field generation portions is an even number of second magnetic field generation portions, each holder has a protrusion portion, the holding surface is a surface extending parallel to the directions in which the medium is to be spread out, in a state in which each holder is attached to the frame forming portion, and the protrusion portion extends toward the inner area of the frame forming portion in a direction intersecting the directions in which the medium is to be spread out, in the state in which each holder is attached to the frame forming portion.

4. The holding frame according to claim 1, wherein the frame forming portion defines an inner area expanding in directions in which the medium is to be spread out, each holder has at least one grasping portion, and the at least one grasping portion is formed in a shape protruding farther in a direction parallel to the directions in which the medium is to be spread out than the frame forming portion, or a shape positioned at an interval above the placement surface of the frame forming portion, in a state in which each holder is attached to the frame forming portion.

5. The holding frame according to claim 1, wherein a non-slip portion is arranged on the placement surface of the frame forming portion, the non-slip portion generating more friction than the friction generated between the medium and the placement surface of the frame forming portion.

6. The holding frame according to claim 1, wherein each holder extends in an extending direction of the holder along the frame forming portion, in a state in which each holder is attached to the frame forming portion, at least one specific second magnetic field generation portion, from among the plurality of second magnetic field generation portions, is arranged between a center of each holder and an end portion of each holder, in the extending direction of the holder, and a distance between the end portion of each holder and a center of the specific second magnetic field generation portion is shorter than a distance between the center of each holder and the center of the specific second magnetic field generation portion.

7. The holding frame according to claim 1, wherein the frame forming portion has a plurality of frame side portions and a plurality of connection portions, the plurality of first magnetic field generation portions are arranged on each frame side portion of the plurality of frame side portions, each connection portion of the plurality of connection portions connects end portions of two adjacent frame side portions, from among the plurality of frame side portions, the two frame side portions connected to the connection portions extend in different frame extending directions, respectively, at least one specific first magnetic field generation portion, from among the plurality of first magnetic field generation portions arranged on a specific frame side portion, from among the plurality of frame side portions, is arranged between a center of the specific frame side portion and the end portions of the specific frame side portion connected to the connection portions, in the frame extending direction of the specific frame side portion, and a distance between the end portions of the specific frame side portion connected to the connection portions and a center of the specific first magnetic field generation portion is shorter than a distance between the center of the specific frame side portion and the center of the specific first magnetic field generation portion.

8. The holding frame according to claim 7 wherein the at least one holder is arranged in the frame side portions in a number that is an integral multiple of the length of the holder in the longitudinal direction, a length obtained by multiplying the length in the longitudinal direction of the holder by the integral number is equal to or less than the length in the longitudinal direction of the frame side portions, and the frame forming portion has the same number of the first magnetic field generation portions as the total number of the second magnetic field generation portions of the plurality of holders.

9. The holding frame according to claim 1, wherein the at least one holder has a rectangular shape.

10. The holding frame according to claim 1, wherein the frame forming portion has a rectangular shape.

11. The holding frame according to claim 10, wherein an even number of magnets are arranged on each side of the frame forming portion.

12. The holding frame according to claim 1, wherein the at least one holder includes two second magnets such that the orientations of the magnetic fields of adjacent second magnets are reversed from each other.

13. The holding frame according to claim 1, further comprising:

an additional fixing frame accommodating the first magnet; and an additional fastener including an additional retaining tab;

wherein the additional fixing frame is fixed to the frame forming portion with the additional retaining tab of the additional fastener.

* * * * *